(12) United States Patent
Jung et al.

(10) Patent No.: US 8,595,759 B2
(45) Date of Patent: *Nov. 26, 2013

(54) INFORMATION STORAGE MEDIUM STORING A PLURALITY OF TITLES, REPRODUCING APPARATUS AND METHOD THEREOF

(75) Inventors: Kil-soo Jung, Gyeonggi-do (KR); Seong-jin Moon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 723 days.

This patent is subject to a terminal disclaimer.

(21) Appl. No.: 10/942,814

(22) Filed: Sep. 17, 2004

(65) Prior Publication Data

US 2005/0030371 A1    Feb. 10, 2005

Related U.S. Application Data

(63) Continuation of application No. 10/797,563, filed on Mar. 11, 2004, now abandoned.

(60) Provisional application No. 60/511,100, filed on Oct. 15, 2003.

(30) Foreign Application Priority Data

| Mar. 13, 2003 | (KR) | 2003-15859 |
| Mar. 31, 2003 | (KR) | 2003-19963 |
| Oct. 7, 2003 | (KR) | 2003-69719 |
| Feb. 3, 2004 | (KR) | 2004-6977 |

(51) Int. Cl.
*H04N 7/16* (2011.01)

(52) U.S. Cl.
USPC ............... 725/28; 725/27; 725/29; 725/30; 386/241; 386/248

(58) Field of Classification Search
USPC ............... 725/27, 28, 29, 30; 348/241, 248
See application file for complete search history.

(56) References Cited

U.S. PATENT DOCUMENTS

| 5,583,576 A | 12/1996 | Perlman et al. | |
| 5,629,733 A * | 5/1997 | Youman et al. | 725/53 |
| 5,771,334 A * | 6/1998 | Yamauchi et al. | 386/95 |

(Continued)

FOREIGN PATENT DOCUMENTS

| CN | 1164924 | 11/1997 |
| CN | 1317138 | 10/2001 |

(Continued)

OTHER PUBLICATIONS

What's on a DVD?, Oct. 9, 2003, All Pages.*

(Continued)

*Primary Examiner* — Jason Salce
(74) *Attorney, Agent, or Firm* — NSIP Law (57) ABSTRACT

An information storage medium on which a plurality of titles are recorded, and a reproducing apparatus and method thereof. The information storage medium includes a plurality of titles which are reproduced as motion pictures and a plurality of units of attribute information that correspond to the titles and indicate whether a user can control a title to be reproduced. Therefore, efficient navigation can be ensured and the titles can be reproduced as a manufacturer of the information storage medium has planned.

2 Claims, 7 Drawing Sheets

(56) References Cited

U.S. PATENT DOCUMENTS

| | | | |
|---|---|---|---|
| 5,835,722 A * | 11/1998 | Bradshaw et al. | 709/225 |
| 5,889,746 A * | 3/1999 | Moriyama et al. | 369/30.03 |
| 5,915,067 A * | 6/1999 | Nonomura et al. | 386/70 |
| 5,933,569 A * | 8/1999 | Sawabe et al. | 386/94 |
| 6,434,097 B1 * | 8/2002 | Lewis et al. | 369/47.11 |
| 6,469,718 B1 * | 10/2002 | Setogawa et al. | 715/810 |
| 6,532,335 B2 * | 3/2003 | Otomo et al. | 386/95 |
| 6,580,870 B1 * | 6/2003 | Kanazawa et al. | 386/95 |
| 6,625,388 B2 | 9/2003 | Winter et al. | |
| 6,662,060 B1 * | 12/2003 | Maliszewski et al. | 700/94 |
| 6,694,090 B1 * | 2/2004 | Lewis et al. | 386/94 |
| 6,732,367 B1 * | 5/2004 | Ellis et al. | 725/27 |
| 7,245,719 B2 * | 7/2007 | Kawada et al. | 380/201 |
| 7,617,518 B2 * | 11/2009 | Jung et al. | 725/153 |
| 2001/0037459 A1 | 11/2001 | Ogawa et al. | |
| 2002/0040475 A1 * | 4/2002 | Yap et al. | 725/39 |
| 2002/0110368 A1 | 8/2002 | Mori et al. | |
| 2002/0127002 A1 | 9/2002 | Mori et al. | |
| 2002/0194618 A1 | 12/2002 | Okada et al. | |
| 2003/0007782 A1 | 1/2003 | Kamen | |
| 2003/0081943 A1 | 5/2003 | Kim et al. | |
| 2003/0086693 A1 | 5/2003 | Chung | |
| 2003/0113096 A1 | 6/2003 | Taira et al. | |
| 2005/0030371 A1 * | 2/2005 | Jung et al. | 348/40 |
| 2009/0180757 A1 * | 7/2009 | De Haan | 386/95 |

FOREIGN PATENT DOCUMENTS

| | | |
|---|---|---|
| EP | 0 737 009 | 10/1996 |
| EP | 0 737 979 | 10/1996 |
| EP | 0788105 | 8/1997 |
| EP | 0 872 839 | 10/1998 |
| EP | 0 806 112 B1 | 6/2002 |
| JP | 11-225324 | 8/1999 |
| JP | 11-238367 | 8/1999 |
| JP | 11-341443 A | 12/1999 |
| JP | 2000-298947 | 10/2000 |
| JP | 2001-312880 | 11/2001 |
| JP | 4191191 B2 | 9/2008 |
| TW | 517497 | 1/2003 |
| WO | WO 00/05715 | 2/2000 |
| WO | 02/069339 | 9/2002 |
| WO | 04/001752 | 12/2003 |
| WO | WO 2004/075547 | 9/2004 |

OTHER PUBLICATIONS

U.S. Appl. No. 10/797,563, filed Mar. 11, 2004, Kil-soo Jung et al., Samsung Electronics Co., Ltd.
U.S. Appl. No. 10/942,813, filed Sep. 17, 2004, Kil-soo Jung et al., Samsung Electronics Co., Ltd.
U.S. Appl. No. 10/942,834, filed Sep. 17, 2004, Kil-soo Jung et al., Samsung Electronics Co., Ltd.
U.S. Appl. No. 12/054,596, filed Mar. 25, 2008, Kil-soo Jung et al., Samsung Electronics Co., Ltd.
U.S. Appl. No. 12/054,697, filed Mar. 25, 2008, Kil-soo Jung et al., Samsung Electronics Co., Ltd.
International Search Report issued in Singapore Patent Application No. 200600356-0 on Dec. 4, 2008.
Preliminary Notice of the First Office Action issued in Taiwan Patent Application No. 93106610 on Jan. 22, 2009.
Office Action issued in Mexico Patent Application No. PA/a/2005/013140 dated Apr. 15, 2009.
Canadian Office Action issued on Aug. 12, 2009, in corresponding Canadian Application No. 2,515,252 (4 pages).
Chinese Office Action issued on Mar. 1, 2010, in corresponding Chinese Application No. 200480005226.5 (3 pages).
Office Action issued in corresponding Chinese Patent Application No. 200480005226.5 dated Apr. 25, 2008.
Canadian Office Action issued on Mar. 21, 2011, in counterpart Canadian Application No. 2,693,757 (4 pages).
Taiwanese Preliminary Notice of the First Office Action dated Aug. 29, 2012, issued in counterpart Taiwanese Patent Application No. 097110826; 7 pages including English translation.
Malaysian Notice of Grant issued Mar. 29, 2013 in counterpart Malaysian Application No. PI20040869 (3 pages, in English).
Malaysian Notice of Grant issued Apr. 4, 2013 in counterpart Malaysian Application No. PI20080648 (3 pages, in English).
Chinese Third Office Action dated Apr. 17, 2012, issued in counterpart Chinese Patent Application No. 201010200130.1; 9 pages including English translation.

* cited by examiner

INFORMATION STORAGE MEDIUM STORING A PLURALITY OF TITLES, REPRODUCING APPARATUS AND METHOD THEREOF

CROSS-REFERENCE TO RELATED APPLICATIONS

This application is a continuation of application Ser. No. 10/797,563 filed on Mar. 11, 2004, now abandoned, which claims the benefit of Korean Patent Application Nos. 2003-15859 filed on Mar. 13, 2003, 2003-19963 filed on Mar. 31, 2003, 2003-69719 filed on Oct. 7, 2003, and 2004-6977 filed on Feb. 3, 2004, in the Korean Intellectual Property Office, and U.S. Provisional Application No. 60/511,100 filed on Oct. 15, 2003, in the U.S. Patent and Trademark Office, now expired, the disclosures of which are incorporated herein by reference in their entireties.

BACKGROUND OF THE INVENTION

1. Field of the Invention

The present invention relates to reproduction of audio/video (AV) data, and more particularly, to an information storage medium on which AV data and data providing a navigation function such as a search function are recorded, and an apparatus and method of reproducing the data.

2. Description of the Related Art

Video titles are composed of AV data which is recorded on a Digital Video Disc (DVD)-Video disc. Additionally, navigation data which enables a user to select superimposed dialogues or search for scenes while reproducing the video titles is also recorded on the DVD-Video disc.

However, there is a demand for more interaction with users and more efficient reproduction of the AV data.

SUMMARY OF THE INVENTION

The present invention provides an information storage medium with a data structure in which audio/video (AV) data can be efficiently reproduced and a navigation function can be efficiently performed, and a reproducing apparatus and method of reproducing titles as motion pictures.

The present invention further provides an information storage medium with a data structure through which various applications can be provided, and a reproducing apparatus and method of providing the various applications.

According to an aspect of the present invention, there is provided an information storage medium including: a plurality of titles which are reproduced as motion pictures; and a plurality of units of attribute information, which correspond to the titles and indicate whether a user can control a title to be reproduced.

The titles may be recorded with core mode data which includes audio/video data and navigation data reproducing the audio/video data.

Each of the titles may include at least one navigation object, and the at least one navigation object may include a navigation command which provides a command to a playlist corresponding to the title.

The title may include core mode data, which includes audio/video data and navigation data reproducing the audio/video data; and full mode data, which includes program data that enables interaction with a user and browsing data that enables Internet browsing, or the title may include a navigation object, and at least one of a browsing object that enables web browsing and a program object that enables interaction with a user.

Additional aspects and/or advantages of the invention will be set forth in part in the description which follows and, in part, will be obvious from the description, or may be learned by practice of the invention.

According to another aspect of the invention, there is provided an information storage medium including: a plurality of titles which are reproduced as moving pictures; and title access type information which corresponds to the titles and indicates whether a corresponding title can be searched for by a user operation.

The title access type information may further include title number display type information indicating whether a title number of the corresponding title is displayed.

According to another aspect of the present invention, a reproducing apparatus includes a reader, which reads a plurality of titles to be reproduced as motion pictures and a plurality of units of title information that correspond to the titles; a buffer, which buffers the data read by the reader; and a decoder, which interprets the title information to indicate an entry point of a title and reproduces the title, wherein the decoder interprets attribute information contained in the title information to indicate whether a user can control the title to be reproduced.

The decoder may reproduce the titles, which are recorded with core mode data that includes audio/video data and navigation data reproducing the audio/video data, execute at least one navigation object that is indicated by the entry point of the title, or execute a navigation object that includes a navigation command that provides a command to reproduce a playlist corresponding to the title.

The decoder may reproduce the title which includes: core mode data, which includes audio/video data and navigation data reproducing the audio/video data; and full mode data, which includes program data that enables interaction with a user and browsing data that enables Internet browsing, execute at least one of a navigation object corresponding to the title, a browsing object that enables web browsing, and a program object that enables interaction with a user, or execute the navigation object implemented as a command program which provides a command to reproduce the playlist, the browsing object implemented as a file, which is recorded with a markup language and an executing script language, and the program object implemented as a specific program file.

The decoder may determine that the title can be searched for by the user operation if access type information as the attribute information represents the title as "normal title", and the title cannot be searched for by the user operation if the access type information represents the title as "hidden title". If the access type information represents the title as "hidden title", the decoder may display a title number of the title when the title is reproduced according to information which is contained in the attribute information that indicates whether the title number of the title is displayed.

According to still another aspect of the present invention, there is provided a reproducing method including: reading a plurality of titles that are reproduced as motion pictures and a plurality of units of title information that correspond to the titles; and interpreting attribute information included in the title information that indicates whether a user operation can search for a corresponding title, interpreting the title information to indicate an entry point of the title, and reproducing the title.

The information interpreting and title reproducing may include reproducing the titles that are recorded with core mode data that includes audio/video data and navigation data for reproducing the audio/video data, executing at least one navigation object that is indicated by the entry point of the title, or executing a navigation object that includes a navigation command that provides a command to reproduce a playlist corresponding to the title.

The information interpreting and title reproducing may include reproducing the title which includes: core mode data, which contains audio/video data and navigation data for reproducing the audio/video data; and full mode data, which contains program data that enables interaction with a user and browsing data that enables Internet browsing, executing at least one of a navigation object corresponding to the title, a browsing object that enables web browsing, and a program object that enables interaction with a user, or executing the navigation object implemented as a command program which provides a command to reproduce the playlist, the browsing object implemented as a file, which is recorded with a markup language and an executing script language, and the program object implemented as a specific program file.

The information interpreting and title reproducing may include determining that the title can be searched for by the user operation if access type information as the attribute information represents the title as "normal title", and the title cannot be searched for by the user operation if the access type information represents the title as "hidden title". If the access type information represents the title as "hidden title", the information interpreting and title reproducing step may include displaying a title number of the title when the title is reproduced according to information which is contained in the attribute information that indicates whether the title number of the title is displayed.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1A:
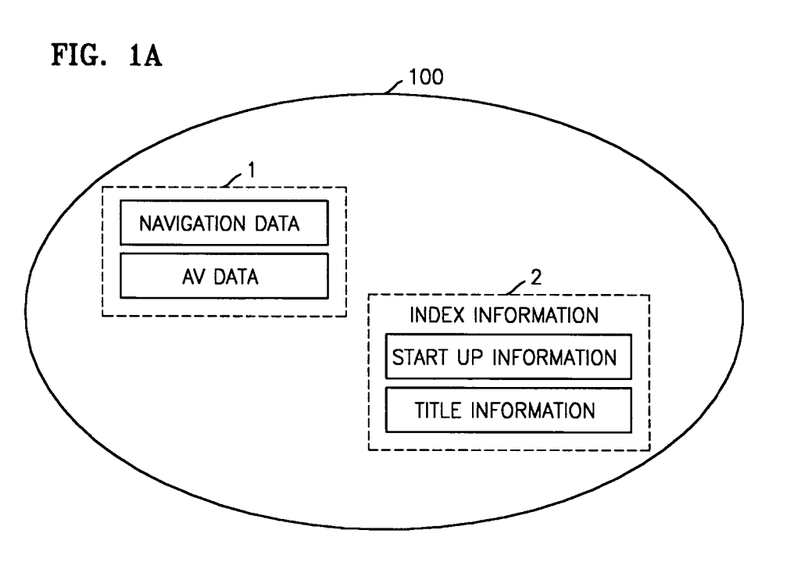
FIGS. 1A, 1B, and 1C are diagrams illustrating various kinds of data recorded on a disc 100 according to an embodiment of the present invention.
Figure 1B:
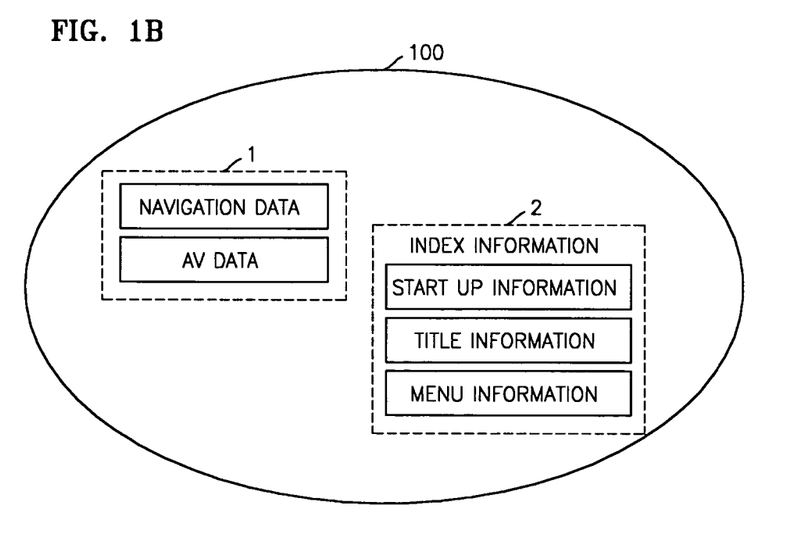
Figure 1C:
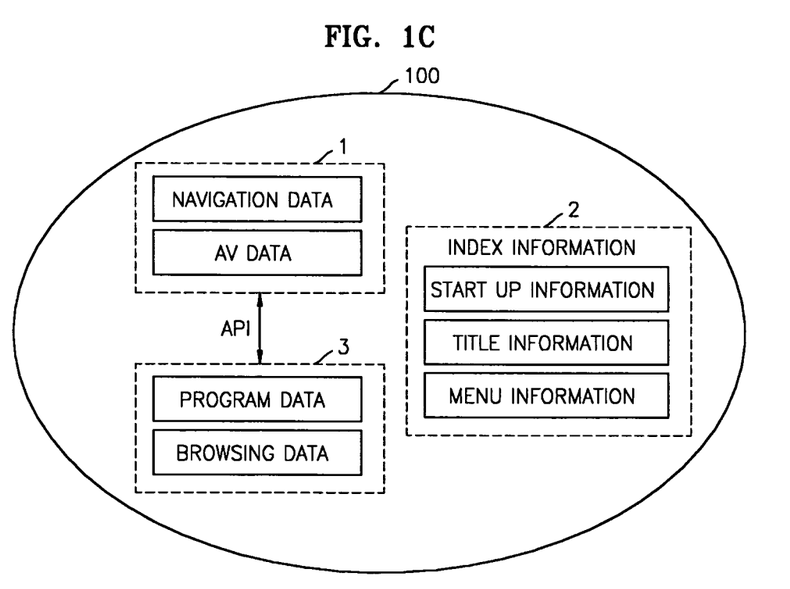

FIGS. 1A, 1B, and 1C are diagrams illustrating various kinds of data recorded on a disc 100 according to an embodiment of the present invention. Data having the same function are given the same reference numerals. However, although the data are given the same reference numerals, the data may be different from one another with respect to the contents and structure.

Referring to FIG. 1A, core mode data 1 and index information 2 are stored on the disc 100. The core mode data 1 comprises audio/video (AV) data that includes a plurality of titles and navigation data which has a plurality of navigation commands for navigating the AV data, similar to a conventional digital video disc (DVD)-Video disc. The structure of the core mode data 1 meets the requirements of the DVD-Video standard.

The index information 2 is system data, which enables a user to search for the core mode data 1 or reproduce the core mode data 1. The index information 2 designates reproduction paths of the plurality of titles that are recorded in the core mode data 1 according to a disc manufacturer's intentions. More particularly, the index information 2 comprises start up information and title information. The start up information indicates the initial AV data of a title that is to be reproduced when the disc 100 is inserted into a reproducing apparatus. The title information indicates the initial AV data of the plurality of titles to be reproduced and attribute information, which are referred to when reproducing the plurality of titles stored in the disc 100. The attribute information indicates whether a user can directly control a title to be reproduced. If the user cannot directly control the title to be reproduced, the attribute information may further contain information which indicates whether a title number of the title is displayed.

A mode in which the start up information contained in the index information 2 is reproduced is referred to as a start up mode. A mode in which the core mode data 1 is reproduced is referred to as a core mode or movie mode and the core mode is performed in the same manner as in the conventional DVD-Video disc.

Referring to FIG. 1B, core mode data 1 and index information 2 are stored on the disc 100, similarly to FIG. 1A. However, the index information 2 shown in FIG. 1B comprises start up information, title information, and menu information.

The core mode data 1 comprises AV data that includes a plurality of titles and navigation data which has a plurality of navigation commands navigating the AV data, similar to the conventional DVD-Video disc.

The start up information has the entry point that indicates the initial AV data of a title that is to be reproduced when the disc 100 is inserted into a reproducing apparatus. The title information has the entry point that indicates the initial AV data of the plurality of titles to be reproduced and attribute information, which are referred to when reproducing the plurality of titles stored in the disc 100. The attribute information indicates whether a user can directly control a title to be reproduced. If the user cannot directly control the title to be reproduced, the attribute information further contains information which indicates whether a title number of the title is displayed. This information is referred to as title number display type information.

The menu information displays a list of titles that can be selected and reproduced by the user among the plurality of titles that are recorded with the AV data, such that the user can select one of the titles.

Referring to FIG. 1C, core mode data 1, index information 2, and full mode data 3 are stored on the disc 100. The full mode data 3 comprises program data that enables interaction with the user, and browsing data that enables Internet browsing. Java applications that provide various functions for interaction with users can be included in the program data. The browsing data includes a markup document that is recorded with a markup language such as Extensible Markup Language (XML), a markup document that includes or links a script code such as a European Computer Manufacturers' Association (ECMA) script code, a script file, and a resource file including at least one image, graphic, and sound referred to by a markup document.

The full mode data 3 and the core mode data 1 can communicate with each other using an Application Program Interface (API).

The titles include several different mode data. In other words, the titles include at least part of the AV data which is included in the core mode data 1 and the browsing data and the program data which are included in the full mode data 3. For example, while a movie is being displayed, a quiz relating to a scene can be displayed, or an Internet page giving the latest information about actors and actresses appearing in the scene can be displayed.

The index information 2 is system data, which enables the user to more conveniently search for or reproduce the core mode data 1 and the full mode data 3. The index information 2 designates reproduction paths of the plurality of titles that are comprised of the core mode data 1 and the full mode data 3 according to the disc manufacturer's intentions. More particularly, the index information 2 comprises start up information, title information, and menu information, similarly to the index information described with reference to FIG. 1B. The title information indicates the initial AV data of the plurality of titles to be reproduced and attribute information, which is referred to when reproducing the plurality of titles stored in the disc 100. The attribute information indicates whether the user can directly control a title to be reproduced. If the user cannot directly control the title to be reproduced, the attribute information may further contain information which indicates whether a title number of the title is displayed.

Similar to the modes described with reference to FIGS. 1A and 1B, a mode in which the start up information and the menu information are reproduced is referred to as a start up mode, a mode in which the core mode data is reproduced is referred to as a core mode, a mode in which program data is reproduced is referred to as a program mode, and a mode in which the browsing data is reproduced is referred to as a browsing mode.

When the disc 100 is reproduced, the reproducing apparatus first reads the start up information and searches for data indicated by the start up information to reproduce the data. If the start up information provides instructions to reproduce the core mode data, the reproducing apparatus is set to the core mode, if the start up information provides instructions to reproduce the program data, the reproducing apparatus is set to the program mode, and if the start up information provides instructions to reproduce the browsing data, the reproducing apparatus is set to the browsing mode.

For example, the AV data shown in FIGS. 1A, 1B, and 1C is recorded as an AV stream file that is encoded using a Moving Picture Experts Group (MPEG)-2 encoding method. A continuous AV stream file is called a clip stream file. A clip information file corresponds to each clip stream file. Reproduction control information regarding the clip stream file, for example, mapping information which maps a reproduction time and a recording position, is stored in the clip information file. The clip information file that corresponds to the clip stream file is referred to as a clip.

A playlist indicates at least a part of one of the clips. In other words, the playlist is a unit of reproduction, and corresponds to one clip, a part of one of the clips, a plurality of the clips, or parts of a plurality of the clips. The playlist can be reproduced via the API as an object in the browsing mode and the program mode. A playlist is a unit of reproduction described from a player's point of view while a title is a unit of reproduction described from the user's point of view. That is, a title corresponds to at least one playlist.

The navigation data is typically stored in the form of a binary code table. In an embodiment of the present invention, the navigation data includes a plurality of commands including commands reproducing a predetermined playlist and commands reproducing another playlist during the reproduction of the predetermined playlist.

Figure 2A:
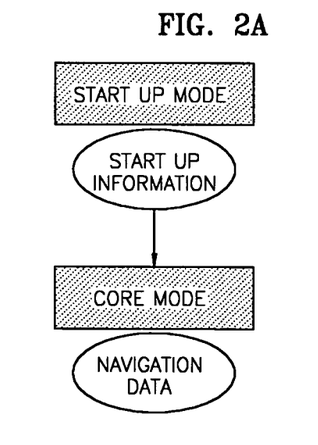
FIG. 2A is a diagram illustrating the relationship between reproduction modes of the disc 100 of FIG. 1A or 1B.

FIG. 2A is a diagram illustrating the relationship between reproduction modes of the disc of FIG. 1A or 1B. Referring to FIG. 2A, after the disc 100 of FIG. 1A or 1B is loaded into the reproducing apparatus, the reproducing apparatus reads the start up information and determines the location from which the initial AV data of a title is to be reproduced so as to initiate the reproduction of the title. For example, the start up information can be implemented using a navigation command that provides instructions to reproduce a specific playlist that should be reproduced. After the start up mode is completed, the mode is changed into core mode.

Figure 2B:
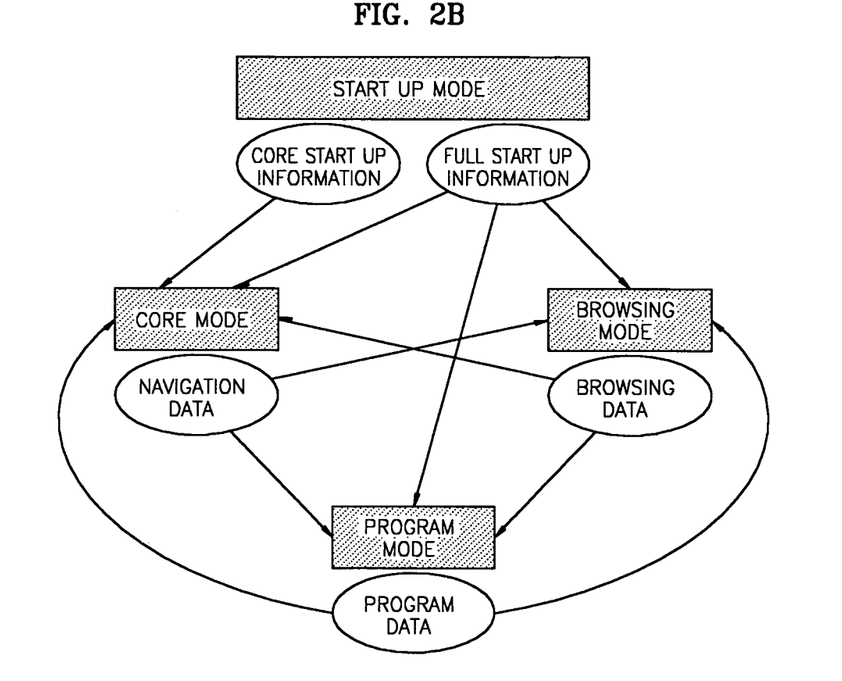
FIG. 2B is a diagram illustrating the relationship among reproduction modes of the disc 100 of FIG. 1C.

FIG. 2B is a diagram illustrating the relationship among reproduction modes of the disc 100 of FIG. 1C. Referring to FIG. 2B, after the disc 100 of FIG. 1C is loaded into the reproducing apparatus, the reproducing apparatus reads the start up information and determines the location of the initial AV data of a title which is to be reproduced so as to initiate the reproduction of the title. For example, the start up information can be implemented using a navigation command which gives instructions to reproduce a specific playlist that should be reproduced. After the start up mode is completed, the mode is changed into the core mode.

Because some reproducing apparatuses can reproduce only the core mode data, both core start up information and full start up information must be included in the start up mode. If the core start up information does not exist, a reproducing apparatus that can reproduce only the core mode data cannot operate. Particularly, when a disc in which the start up information only provides instructions to reproduce the full mode data, it is impossible to initiate reproduction. For this reason, both the core start up information and the full start up information are provided in the start up mode, so that the reproducing apparatus that can reproduce only the core mode data can initiate reproduction using the core start up information.

If the start up information contains commands to initially reproduce core mode data 1, the start up mode is converted into the core mode. If the start up information contains commands to initially reproduce the full mode data, the start up mode is converted into the full mode.

Figure 3A:
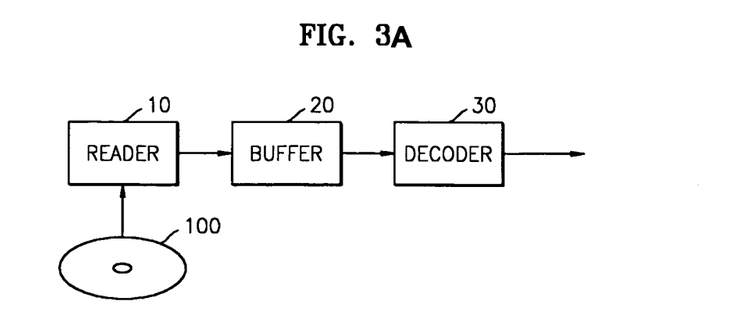
FIG. 3A is a block diagram of a reproducing apparatus which supports both a core mode and a full mode according to an embodiment of the present invention.

FIG. 3A is a block diagram of a reproducing apparatus which supports both the core mode and the full mode according to an embodiment of the present invention.

Referring to FIG. 3A, the reproducing apparatus reproduces the AV data in the core mode or the full mode by using the core mode data 1 and/or the full mode data 3 stored in the disc 100. The reproducing apparatus includes a reader 10, a buffer 20, and a decoder 30.

The reader 10 reads the necessary data from the disc 100. The buffer 20 buffers the data read by the reader 10. The decoder 30 decodes and outputs the data buffered by the buffer 20.

Figure 3B:
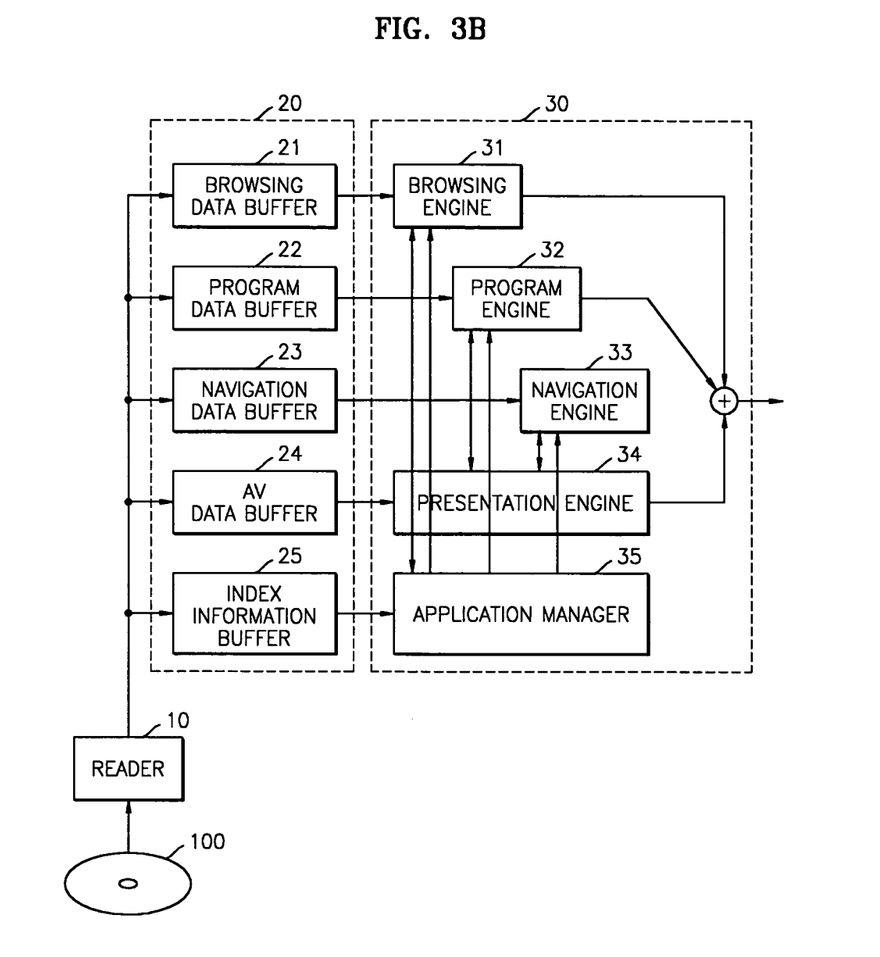
FIG. 3B is a detailed block diagram of the reproducing apparatus of FIG. 3A.

FIG. 3B is a detailed block diagram of the reproducing apparatus of FIG. 3A.

Referring to FIG. 3B, the buffer 20 includes a browsing data buffer 21 which buffers the browsing data, a program data buffer 22 which buffers the program data, a navigation data buffer 23 which buffers the navigation data, an AV data buffer 24 which buffers the AV data, and an index information buffer 25 which buffers the index information.

The decoder 30 includes a browsing engine 31 which interprets the browsing data and executes browsing commands, a program engine 32 which interprets the program data and executes program commands, a navigation engine 33 which interprets the navigation data and executes navigation commands, and a presentation engine 34 which decodes the AV data. These engines can transmit information to one another via the API.

In particular, the decoder 30 includes an application manager 35 which interprets the index information. The application manager 35 selects and reproduces a title which is to be first reproduced according to an entry point indicated by the start up information contained in the index information, and informs the engine corresponding to the entry point according to mode conversion during the reproduction. Further, the application manager 35 receives a user's input and transmits the input to the engine that corresponds to the user's input mode.

Figure 4A:
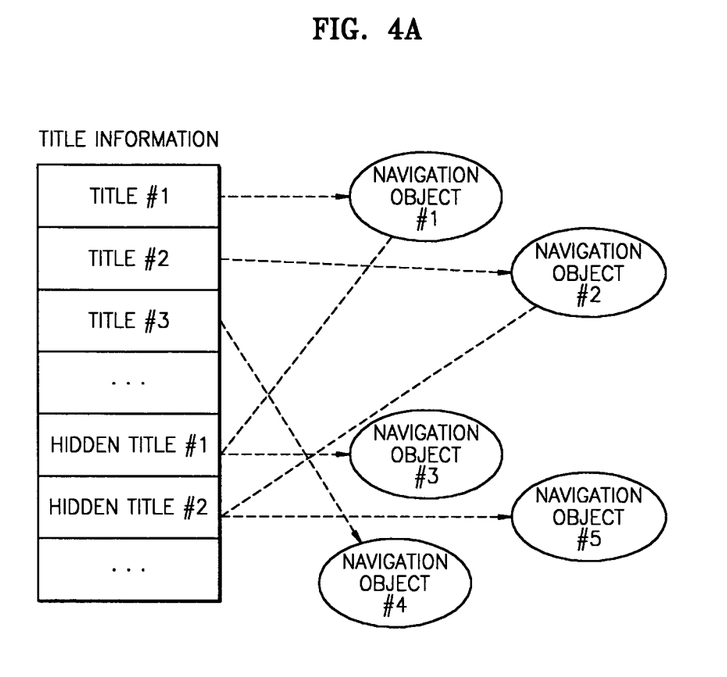
FIG. 4A is a diagram explaining a method of reproducing core mode data recorded on the disc 100 of FIG. 1A or 1B.

FIG. 4A is a diagram explaining a method of reproducing the core mode data stored in the disc 100 of FIG. 1A or 1B.

Referring to FIG. 4A, the title information comprises a plurality of units of information, each of which designates a navigation object. The unit information is implemented as a title #i or a hidden title #j. The title #i can be reproduced in response to a user. The hidden title #j cannot be reproduced by the user. That is, the hidden title #j is reproduced only in the order predetermined by a manufacturer of the disc 100. In other words, allowing reproduction control allows the titles to be searched for by a user initiated operation.

When a specific title is selected through a title search in the disc 100 of FIG. 1A or the menu information is reproduced and one of the titles shown in the menu is selected from the disc 100 of FIG. 1B, the title information indicates an entry point where data is to be initially executed or reproduced, that is, a navigation object. The navigation object is implemented as an executable navigation command program. In other words, the navigation object is an upper layer of the playlist that is a unit of reproduction, and includes the navigation command that initiates the reproduction of the specific playlist.

For example, if the user selects a first title #1, the first title #1 includes title information that designates a first navigation object #1, thereby executing the first navigation object #1. The first navigation object #1 includes a navigation command. When the navigation command is executed, a predetermined playlist is reproduced. After the playlist is reproduced according to the first navigation object #1, the first navigation object #1 indicates a first hidden title #1, and a third navigation object #3 designated by the first hidden title #1 is executed. Here, a hidden title is not directly selected by the user to be reproduced. The hidden title is only reproduced in the order predetermined by the disc manufacturer. For example, a moving picture including an official announcement about a copyright, a moving picture of a trailer broadcasted after a movie ends, etc., can be a hidden title. Because these moving pictures are searched by the user operation and need little be reproduced separately, these moving pictures are set to hidden titles and are reproduced only in the order determined by the navigation command.

If the user selects a second title #2, the second title #2 designates a second navigation object #2, thereby executing the second navigation object #2. The second navigation object #2 also includes a navigation command for reproducing a predetermined playlist. The predetermined playlist is reproduced when the navigation command is executed. After the playlist is reproduced according to the second navigation object #2, the second navigation object #2 indicates a second hidden title #2, and a fifth navigation object #5 designated by the second hidden title #2 is executed.

Figure 4B:
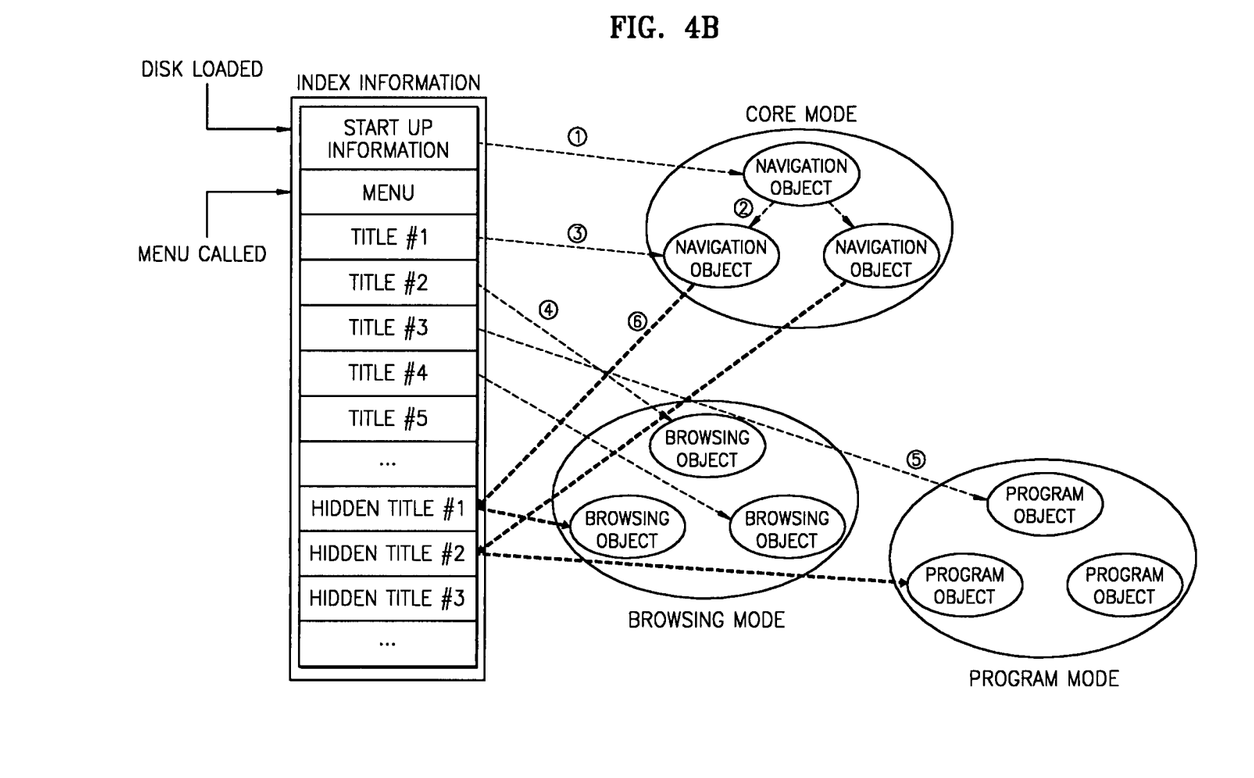
FIG. 4B is a diagram explaining a method of reproducing core mode data and full mode data recorded on the disc 100 of FIG. 1C.

FIG. 4B is a diagram explaining a method of reproducing the core mode data and the full mode data stored in the disc 100 of FIG. 1C.

Referring to FIG. 4B, the index information includes the start up information, the menu information, and the title information. The title information comprises a plurality of units of information each of which designates a navigation object. The unit information is implemented as a title #i or a hidden title #j. The title #i can be controlled by the user to be reproduced and the hidden title #j cannot be controlled by the user to be reproduced. That is, the hidden title #j is reproduced only in the order predetermined by the manufacturer of the disc.

When the disc 100 is loaded into the reproducing apparatus, a plurality of navigation objects are reproduced according to the start up information. If the user calls a menu, the menu information is reproduced. If the user selects one of the titles shown in the menu, the title information indicates an entry point where data is to be initially executed or reproduced, that is, an object.

In an embodiment of the present invention, the object is divided into a navigation object corresponding to the core mode data, a browsing object corresponding to the browsing data, and a program object corresponding to the program data. The navigation object is implemented as a command program that provides a command to reproduce the core mode data, and the browsing object is implemented as a file that is recorded with the browsing data, for example, with a markup language and an executing script language, and has a file name as an entry point. The program object is implemented as a specific program file which has a file name as an entry point.

One object belonging to a predetermined mode can be connected to another object belonging to another mode so as to be reproduced. When objects belonging to the same mode are connected to one another, mode conversion is not required. However, mode conversion is required when objects belonging to different modes are connected to one another. The mode conversion is carried out using the hidden title information contained in the title information. That is, the title information indicates an entry point for title search and an entry point for reproduction of a predetermined title, and the hidden title information indicates an entry point for mode conversion among the core mode, the browsing mode, and the program mode.

After the disc 100 of FIG. 1C is loaded, the reader 10 of the reproducing apparatus reads the index information 2 and transmits the read index information 2 to the application manager 35. The application manager 35 provides instructions from the start up information to indicate a title which is to be initially reproduced. Alternatively, if the user calls a menu and selects a title among the titles shown in the menu, the application manager refers to an entry point of the selected title and transmits an object designated by the selected title to the engine corresponding to the selected title. According to an embodiment of the present invention, because the initial title to be reproduced as instructed by the start up information is a navigation object, in operation 1, an entry point of the navigation object is transmitted to the navigation engine 33. The navigation engine 33 commences the reproduction of the core mode data by transmitting a navigation command contained in the navigation object to the presentation engine 34. In operation 2, another navigation object designated by a first title #1 is reproduced after the navigation object is first executed in the core mode. The navigation object reproduced in operation 2 may be reproduced in operation 3 through a title search. In the same manner, second and third titles #2 and #3 are respectively connected to the browsing object and the program object in operations 4 and 5, and the titles can be reproduced when the user provides a command to reproduce them.

In operation 6, the navigation object designated by the first title #1 is connected to a browsing object via a first hidden title #1. In other words, the mode conversion is performed with reference to the first hidden title #1. In this case, the navigation engine 33 transfers control to the application manager 35. The application manager 35 provides instructions to the browsing engine 31 to reproduce the browsing object designated by the first hidden title #1. In this way, the hidden title cannot be directly accessed by the user. Because a title can include data in a variety of modes through the mode conversion with reference to the hidden title, the user can reproduce the title without regard to the mode conversion.

Figure 5A:
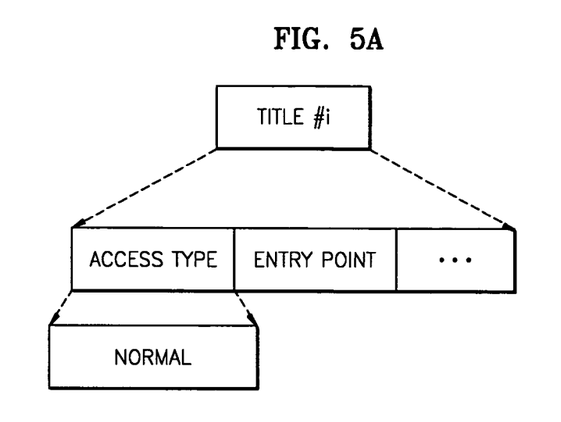
FIG. 5A is a diagram illustrating a data structure of a title #i which is unit information of title information according to the present invention.

FIG. 5A is a diagram illustrating a data structure of a title #i according to an embodiment of the present invention.

Referring to FIG. 5A, the title #i includes access type information that acts as attribute information. The title #i also indicates an entry point of a title. The access type information indicates whether the user can directly control the title to be reproduced. Since the title #i permits the user's direct access, the access type information represents the title #i as "normal title".

Figure 5B:
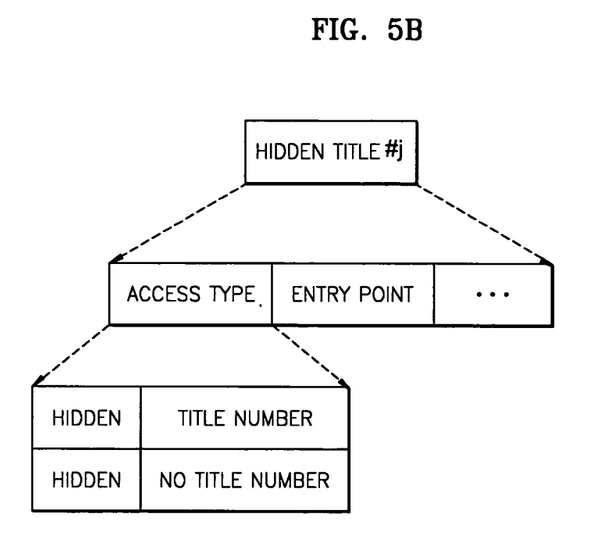
FIG. 5B is a diagram illustrating a data structure of a hidden title #j which is unit information of the title information according to the present invention.

FIG. 5B is a diagram illustrating a data structure of a hidden title #j according to an embodiment of the present, invention.

Referring to FIG. 5B, the hidden title #j also includes access type information that acts as attribute information, and indicates an entry point of a title. The access type information indicates whether the user can directly control the title to be reproduced. Because the hidden title #j prohibits the user's direct access, the access type information represents the title #j as "hidden". The access type information further contains information that indicates whether a title number of the "hidden" title is displayed to the user. That is, the access type information displays the title number when the title number is allotted to the hidden title and does not display the title number when the title number is not allotted to the hidden title.

For example, assuming that the access type information is represented in a binary form, if the value of 1 bit of the access type information is "1", the title is a hidden title that is used only as a bridge point for mode conversion, while if the value of the access type information is "0", the title is a normal title that can also be used as an access point for title search.

Table 1 shows a case where only title access type information of 1 bit is included in the attribute information and Table 2 shows a case where title access type information and title display information are included in the attribute information, respectively. Here, the attribute information may be index table information.

TABLE 1

| Title access type | Result |
| --- | --- |
| 0 | Title search is allowable by a user |
| 1 | Title search is not allowable by a user |

TABLE 2

| Title access type | Result |
| --- | --- |
| 00 | Title search is allowable by a user and a title number is displayed |
| 01 | Title search is allowable by a user and a title number is not displayed |
| 10 | Title search is not allowable by a user and a title number is displayed |
| 11 | Title search is not allowable by a user and a title number is not displayed |

Referring to Table 2, a first bit of the title access type indicates whether a corresponding title can be searched for directly by a user operation or whether the corresponding title can be searched for only by a navigation command. A second bit of the title access type indicates whether the title number is displayed to a user.

The present invention may be embodied in a general purpose digital computer by running a program from a computer usable medium, including but not limited to storage media such as magnetic storage media (e.g., ROMs, RAMs, floppy discs, hard discs, etc.), optically readable media (e.g., CD-ROMs, DVDs, etc.). The computer readable recording medium can be dispersively installed in a computer system connected to a network, and stored and executed as a computer readable code in a distributed computing environment.

As described above, because attribute information indicates whether a plurality of titles are hidden titles or not, a disc manufacturer can produce contents with which various applications can be made. That is, because the titles are divided into titles that can be accessed directly and titles that can only be accessed in a predetermined order determined by the manufacturer of the disc, contents suitable for the disc manufacturer's intentions can be produced. Accordingly, various applications can be provided to users.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for reproducing at least one title audio/video data stream from an information storage medium using a reproducing apparatus, the method comprising:

reading index information from the information storage medium, using the reproducing apparatus, the index information comprising:

startup information designating a title audio/video data stream, the title audio/video data stream designated by the startup information being a title audio/video data stream that is played back automatically by the reproducing apparatus when the information store medium is loaded into the reproducing apparatus; and title information corresponding to each of a plurality of title audio/video data streams recorded separately from the index information, the title information comprising attribute information corresponding to each of the plurality of title audio/video data streams;

reproducing a first title audio/video data stream based on the index information;

receiving a title search user operation instructing to reproduce a second title audio/video data stream, during reproducing the first title audio/video stream, the title search user operation comprises a title number corresponding to the second title audio/video data stream;

identifying attribute information corresponding to the second title audio/video data stream corresponding to the title number, the attribute information being included in the title information;

wherein when the attribute information is a first value, the second title audio/video data stream is reproduced and the title number of the second title audio/video data stream is displayed on a display device;

when the attribute information is a second value, the second title audio/video data stream is not reproduced and the title number of the second title audio/video data stream is displayed on the display device; and when the attribute information is a third value, the second title audio/video data stream is not reproduced and the title number of the second title audio/video data stream is not displayed on the display device.

2. The method of claim 1, wherein the attribute information indicates that a user of the reproducing apparatus is permitted to directly control reproduction of the corresponding title audio/video data stream using the title search user operation or indicates that the user is not permitted to directly control reproduction of the corresponding title audio/video data stream using the title search user operation.

\* \* \* \* \*